US012785900B2

(12) United States Patent
Nammi et al.

(10) Patent No.: US 12,785,900 B2
(45) Date of Patent: Nov. 3, 2026

(54) METHOD AND DEVICE FOR CONFIGURING AND TRANSMITTING HARQ FEEDBACK FOR UNICAST AND MULTICAST IN WIRELESS NETWORKS

(71) Applicant: TELEFONAKTIEBOLAGET LM ERICSSON (PUBL), Stockholm (SE)

(72) Inventors: Sairamesh Nammi, Kista (SE); Ratheesh Kumar Mungara, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 354 days.

(21) Appl. No.: 18/023,851

(22) PCT Filed: Sep. 22, 2021

(86) PCT No.: PCT/SE2021/050919
§ 371 (c)(1),
(2) Date: Feb. 28, 2023

(87) PCT Pub. No.: WO2022/071846
PCT Pub. Date: Apr. 7, 2022

(65) Prior Publication Data
US 2023/0318787 A1 Oct. 5, 2023

Related U.S. Application Data

(60) Provisional application No. 63/086,636, filed on Oct. 2, 2020.

(51) Int. Cl.
*H04L 5/00* (2006.01)
*H04J 13/00* (2011.01)
*H04L 27/26* (2006.01)

(52) U.S. Cl.
CPC ........ *H04L 5/0053* (2013.01); *H04J 13/0059* (2013.01); *H04L 27/2605* (2013.01)

(58) Field of Classification Search
None
See application file for complete search history.

(56) References Cited

U.S. PATENT DOCUMENTS

2015/0110043 A1* 4/2015 Fan ....................... H04L 5/0053 370/329
2019/0132104 A1 5/2019 Lee et al.

FOREIGN PATENT DOCUMENTS

EP 2720401 A1 4/2014
EP 3319256 A1 5/2018

OTHER PUBLICATIONS

PCT International Search Report and Written Opinion for International Application No. PCT/SE2021/050919 mailed Dec. 6, 2021, 11 pages.

* cited by examiner

*Primary Examiner* — Walter J Divito
(74) *Attorney, Agent, or Firm* — Sage Patent Group

(57) ABSTRACT

Acknowledgement feedback is conveyed to a network node for unicast and multicast transmissions received by a wireless device. The wireless device configures uplink control channel resources responsive to an uplink channel format indicated by an uplink channel format indicator. Each possible ACK or NAK combination for the unicast and multicast transmissions maps to a different cyclic shift of a base sequence defined according to the uplink control channel format. The wireless device receives a unicast transmission and a multicast transmission. Further, when in a joint acknowledgement mode, the wireless device configures acknowledgement feedback for the received unicast and multicast transmissions according to the cyclic shift map- (Continued)

ping and jointly transmits the acknowledgement feedback for both the received unicast transmission and the received multicast transmission to the network node in an acknowledgement time slot.

18 Claims, 8 Drawing Sheets

METHOD AND DEVICE FOR CONFIGURING AND TRANSMITTING HARQ FEEDBACK FOR UNICAST AND MULTICAST IN WIRELESS NETWORKS

RELATED APPLICATIONS

This application is a 35 U.S.C § 371 national stage application for International Application No. PCT/SE2021/050919, entitled "METHOD AND DEVICE FOR CONFIGURING AND TRANSMITTING HARQ FEEDBACK FOR UNICAST AND MULTICAST IN WIRELESS NETWORKS", filed on Sep. 22, 2021, which claims priority to U.S. Application No. 63/086,636, filed Oct. 2, 2020, the entire disclosure of which is incorporated by reference herein.

BACKGROUND

As the 3$^{rd}$ Generation Partnership Project (3GPP) extends the 4$^{th}$ Generation (4G) standard to a 5$^{th}$ Generation (5G), which is also referred to as New Radio (NR), wireless providers explore new techniques and solutions to create systems that meet the expanded requirements associated with 5G. For example, because existing 4G Long Term Evolution (LTE) systems support both broadcast and multicast transmissions, it is expected that 5G systems will also support such transmissions even with the expanded 5G requirements. Current 5G solutions are primarily designed for unicast transmissions, where each wireless device receiving a unicast transmission provides acknowledgement feedback, e.g., an ACK or NAK regarding the received unicast transmission. A similar approach may be used for 5G multicast transmissions. However, when a wireless device receives both unicast and multicast transmissions, current solutions do not provide a way for the network node to distinguish the acknowledgement feedback for the unicast transmission from the acknowledgement feedback for the multicast transmission. As such, there remains a need for improved solutions for unicast and multicast transmissions, particularly for 5G.

SUMMARY

The solution presented herein enables a wireless device to simultaneously send acknowledgement feedback for both a received unicast transmission and a multicast transmission in a manner that enables the transmitting network node to clearly differentiate acknowledgement feedback for the unicast transmission from acknowledgement feedback for the multicast transmission. In so doing, the solution presented herein eliminates confusion between acknowledgement feedback for different transmissions without increasing the overhead of the uplink channel used to convey such acknowledgement feedback.

One exemplary embodiment comprises a method of conveying acknowledgement feedback to a network node for unicast and multicast transmissions received by a wireless device. The method is executed by the wireless device and comprises configuring uplink control channel resources responsive to an uplink channel format indicated by an uplink channel format indicator, where each possible ACK or NAK combination for the unicast and multicast transmissions maps to a different cyclic shift of a base sequence defined according to the uplink control channel format. The method further comprises receiving a unicast transmission and a multicast transmission. When in a joint acknowledgement mode, the method comprising configuring acknowledgement feedback for the received unicast and multicast transmissions according to the cyclic shift mapping, and jointly transmitting the acknowledgement feedback for both the received unicast transmission and the received multicast transmission to the network node in an acknowledgement time slot.

In exemplary embodiments, the base sequence comprises a Constant Amplitude Zero Autocorrelation (CAZAC) sequence, and wherein each of the possible combinations of ACK or NAK for the unicast and multicast transmissions maps to a different cyclic shift of the CAZAC sequence. In exemplary embodiments, each of the possible combinations of ACK or NAK for the unicast and multicast transmissions maps to a different cyclic shift of the CAZAC sequence by mapping an ACK for both the received unicast transmission and the received multicast transmission to a cyclic shift of 0 of the CAZAC sequence, mapping a NAK for the received unicast transmission and an ACK for the received multicast transmission to a cyclic shift of 3 of the CAZAC sequence, mapping an ACK for the received unicast transmission and a NAK for the received multicast transmission to a cyclic shift of 6 of the CAZAC sequence, and mapping a NAK for both the received unicast transmission and the received multicast transmission to a cyclic shift of 9 of the CAZAC sequence.

In exemplary embodiments, the base sequence comprises two bits, wherein each of the possible combinations of ACK or NAK for the unicast and multicast transmissions maps to a different cyclic shift of the two bits. In exemplary embodiments, each of the possible combinations of ACK or NAK for the unicast and multicast transmissions maps to a different cyclic shift of the two bits by mapping an ACK for both the received unicast transmission and the received multicast transmission to 00, mapping a NAK for the received unicast transmission and an ACK for the received multicast transmission to 01, mapping an ACK for the received unicast transmission and a NAK for the received multicast transmission to 10, and mapping a NAK for both the received unicast transmission and the received multicast transmission to 11.

In exemplary embodiments, the method further comprises boosting a power for the uplink control channel for the joint acknowledgement mode during the transmission of the acknowledgement feedback. In exemplary embodiments, the method further comprises receiving power control information from the network node (100), wherein the boosting the power comprises boosting the power for the joint acknowledgement mode during transmission of the acknowledgement feedback responsive to the received power control information.

In exemplary embodiments, the method further comprises determining whether the operating mode of the wireless device is the joint acknowledgement mode or a separate acknowledgement mode. When in the separate acknowledgement mode the method further comprises configuring acknowledgement feedback for each of the received unicast and multicast transmissions according to the base sequence, transmitting the acknowledgement feedback for the received unicast transmission in a first acknowledgement time slot, and transmitting the acknowledgement feedback for the received multicast transmission in a second acknowledgement time slot different from the first acknowledgement time slot.

In exemplary embodiments, the method further comprises receiving a mode control signal from the network node, where the mode control signal is derived by the network node responsive to the load of the wireless network.

One exemplary embodiment comprises a wireless device in communication with a network node in a wireless network. The wireless device comprises one or more processing circuits configured to configure uplink control channel resources responsive to an uplink channel format indicated by an uplink channel format indicator, where each possible ACK or NAK combination for the unicast and multicast transmissions maps to a different cyclic shift of a base sequence defined according to the uplink control channel format. The one or more processing circuits are further configured to receive a unicast transmission and a multicast transmission. When in a joint acknowledgement mode, the one or more processing circuits are configured to configure acknowledgement feedback for the received unicast and multicast transmissions according to the cyclic shift mapping, and jointly transmit the acknowledgement feedback for both the received unicast transmission and the received multicast transmission to the network node in an acknowledgement time slot.

One exemplary embodiment comprises a computer program product for controlling a wireless device. The computer program product comprises software instructions which, when run on at least one processing circuit in the wireless device, causes the wireless device to configure uplink control channel resources responsive to an uplink channel format indicated by an uplink channel format indicator, where each possible ACK or NAK combination for the unicast and multicast transmissions maps to a different cyclic shift of a base sequence defined according to the uplink control channel format. The software instructions further cause the wireless device to receive a unicast transmission and a multicast transmission. When in a joint acknowledgement mode, the software instructions further cause the wireless device to configure acknowledgement feedback for the received unicast and multicast transmissions according to the cyclic shift mapping, and jointly transmit the acknowledgement feedback for both the received unicast transmission and the received multicast transmission to the network node in an acknowledgement time slot. In exemplary embodiments, a computer-readable medium comprises the computer program product. In exemplary embodiments, the computer-readable medium comprises a non-transitory computer readable medium.

One exemplary embodiment comprises a wireless device in communication with a network node in a wireless network. The wireless device comprises a receiver, one or more processing circuits, and a transmitter. The receiver is configured to simultaneously receive a unicast transmission and a multicast transmission from the network node. The one or more processing circuits are configured to configure uplink control channel resources responsive to an uplink channel format indicated by an uplink channel format indicator, where each combination of ACK or NAK for the unicast and multicast transmissions maps to a different cyclic shift of a base sequence defined according to the uplink control channel format. When in a joint acknowledgement mode, the one or more processing circuits are further configured to configure acknowledgement feedback for the received unicast and multicast transmissions according to the cyclic shift mapping. The transmitter is configured to, when in the joint acknowledgement mode, jointly transmit the acknowledgement feedback for both the received unicast transmission and the received multicast transmission to the network node in an acknowledgement time slot.

One exemplary embodiment comprises a method of receiving acknowledgement feedback at a network node from a wireless device for unicast and multicast transmissions to the wireless device. The method is executed by the network node and comprises transmitting an uplink channel format indicator to the wireless device to indicate an uplink channel format for uplink control channel resources and transmitting a unicast transmission and a multicast transmission to the wireless device. When the wireless device is configured in a joint acknowledgement mode, the method further comprises receiving acknowledgement feedback from the wireless device for the transmitted unicast and multicast transmissions. The acknowledgement feedback is configured according to a cyclic shift mapping that maps each possible combination of ACK or NAK for the unicast and multicast transmissions to a different cyclic shift of a base sequence defined according to the uplink control channel format indicator. When in the joint acknowledgement mode, the method further comprises determining an ACK or a NAK for the unicast transmission from the received acknowledgement feedback using the cyclic shift mapping and determining an ACK or a NAK for the multicast transmission from the received acknowledgement feedback using the cyclic shift mapping.

In exemplary embodiments, the base sequence comprises a Constant Amplitude Zero Autocorrelation (CAZAC) sequence, wherein each of the possible combinations of ACK or NAK for the unicast and multicast transmissions maps to a different cyclic shift of the CAZAC sequence. In exemplary embodiments, the determining the ACK or the NAK for the unicast and multicast transmissions comprises determining an ACK for both the unicast transmission and the multicast transmission when the CAZAC sequence has a cyclic shift of 0, determining a NAK for the unicast transmission and an ACK for the multicast transmission when the CAZAC sequence has a cyclic shift of 3, determining an ACK for the unicast transmission and a NAK for the multicast transmission when the CAZAC sequence has a cyclic shift of 6, and determining a NAK for both the unicast transmission and the multicast transmission when the CAZAC sequence has a cyclic shift of 9.

In exemplary embodiments, the base sequence comprises two bits, wherein each of the possible combinations of ACK or NAK for the unicast and multicast transmissions maps to a different cyclic shift of the two bits. In exemplary embodiments, the determining the ACK or NAK for the unicast and multicast transmission comprises determining an ACK for both the unicast transmission and the multicast transmission when the received acknowledgement feedback comprises 00, determining a NAK for the unicast transmission and an ACK for the multicast transmission when the received acknowledgement feedback comprises 01, determining an ACK for the unicast transmission and a NAK for the multicast transmission when the received acknowledgement feedback comprises 10, and determining a NAK for both the unicast transmission and the multicast transmission when the received acknowledgement feedback comprises 11.

In exemplary embodiments, the method further comprises transmitting power control information to the wireless device instructing the wireless device to boost an uplink control channel power for the joint acknowledgement mode during transmission of the acknowledgement feedback.

In exemplary embodiments, the method further comprises determining a load of a wireless network comprising the network node and the wireless device, configuring the wireless device to operate in the joint acknowledgement mode when the load of the wireless network exceeds a threshold, and configuring the wireless device to operate in a separate acknowledgement mode when the load of the wireless network is less than or equal to the threshold. When in the separate acknowledgement mode, the method further comprises receiving acknowledgement feedback for the unicast transmission according to the base sequence in a first acknowledgement time slot and receiving acknowledgement feedback for the multicast transmission according to the base sequence in a second acknowledgement time slot different from the first acknowledgement time slot. When in the separate acknowledgement mode, the method further comprises determining an ACK or a NAK for the unicast transmission from the acknowledgement feedback received in the first acknowledgement time slot and determining an ACK or a NAK for the multicast transmission from the acknowledgement feedback received in the second acknowledgement time slot.

In exemplary embodiments, the method further comprises transmitting a mode control signal to the wireless device, where the mode control signal indicates either the joint acknowledgement mode or the separate acknowledgement mode.

One exemplary embodiment comprises a network node in communication with a wireless device in a wireless network. The network node comprises one or more processing circuits configured to transmit an uplink channel format indicator to the wireless device to indicate an uplink channel format for uplink control channel resources and transmit a unicast transmission and a multicast transmission to the wireless device. When the wireless device is configured in a joint acknowledgement mode, the one or more processing circuits are further configured to receive acknowledgement feedback from the wireless device for the transmitted unicast and multicast transmissions. The acknowledgement feedback is configured according to a cyclic shift mapping that maps each possible combination of ACK or NAK for the unicast and multicast transmissions to a different cyclic shift of a base sequence defined according to the uplink control channel format indicator. When in the joint acknowledgement mode, the one or more processing circuits are further configured to determine an ACK or a NAK for the unicast transmission from the received acknowledgement feedback using the cyclic shift mapping, and determining an ACK or a NAK for the multicast transmission from the received acknowledgement feedback using the cyclic shift mapping.

One exemplary embodiment comprises a computer program product for controlling a network node. The computer program product comprises software instructions which, when run on at least one processing circuit in the network node, causes the network node to transmit an uplink channel format indicator to the wireless device to indicate an uplink channel format for uplink control channel resources, and transmit a unicast transmission and a multicast transmission to the wireless device. When the wireless device is configured in a joint acknowledgement mode, the software instructions further cause the network node to receive acknowledgement feedback from the wireless device for the transmitted unicast and multicast transmissions. The acknowledgement feedback is configured according to a cyclic shift mapping that maps each possible combination of ACK or NAK for the unicast and multicast transmissions to a different cyclic shift of a base sequence defined according to the uplink control channel format indicator. When in the joint acknowledgement mode, the software instructions further cause the network node to determine an ACK or a NAK for the unicast transmission from the received acknowledgement feedback using the cyclic shift mapping and determining an ACK or a NAK for the multicast transmission from the received acknowledgement feedback using the cyclic shift mapping. In exemplary embodiments, a computer-readable medium comprising the computer program product. In exemplary embodiments, the computer-readable medium comprises a non-transitory computer readable medium.

One exemplary embodiment comprises a network node in communication with a wireless device in a wireless network. The network node comprises a transmitter, a receiver, and one or more processing circuits. The transmitter is configured to transmit an uplink channel format indicator to the wireless device to indicate an uplink channel format for uplink control channel resources, and to transmit a unicast transmission and a multicast transmission to the wireless device. The receiver is configured to, when the wireless device is configured in a joint acknowledgement mode, receive acknowledgement feedback from the wireless device for the transmitted unicast and multicast transmissions, said acknowledgement feedback configured according to a cyclic shift mapping that maps each possible combination of ACK or NAK for the unicast and multicast transmissions to a different cyclic shift of a base sequence defined according to the uplink control channel format indicator. The one or more processing circuits, when the wireless device is configured in the joint acknowledgement mode, are configured to determine an ACK or a NAK for the unicast transmission from the received acknowledgement feedback using the cyclic shift mapping, and determine an ACK or a NAK for the multicast transmission from the received acknowledgement feedback using the cyclic shift mapping.

DETAILED DESCRIPTION

As noted above, the solution presented herein overcomes challenges associated with acknowledgement feedback received for multiple transmissions, e.g., unicast and multicast transmissions, sent to a wireless device without increasing the overhead required for such acknowledgement feedback. Before discussing the details of the solution presented herein, the following first discusses some basic information regarding unicast and multicast transmissions.

To meet the demand for data centric applications, 3GPP is extending the 4G standards to 5G, which is also referred to as New Radio (NR) access. The following lists some requirements for 5G networks:

- Support data rates of several tens of megabits per second for tens of thousands of users.
- Simultaneously offer 1 gigabit per second to tens of workers on the same office floor.
- Support several hundreds of thousands of simultaneous connections for massive sensor deployments.
- Significantly enhance spectral efficiency as compared to 4G LTE.
- Improve coverage.
- Enhance signaling efficiency.
- Significantly reduce latency as compared to 4G LTE.

It is well known that Multiple Input, Multiple Output (MIMO) systems can significantly increase the data carrying capacity of wireless systems. For these reasons, MIMO is an integral part of the 3G and 4G wireless systems. Similarly, 5G systems will also employ MIMO, e.g., massive MIMO systems (hundreds of antennas at the Transmitter side and/Receiver side). Typically, for 5G systems implementing a ($N_t$, $N_r$) MIMO system, where $N_t$ represents the number of transmit antennas and $N_r$, represents the number of receive antennas, the peak data rate multiplies with a factor of $N_t$ over single antenna systems in rich scattering environment.

Figure 1:
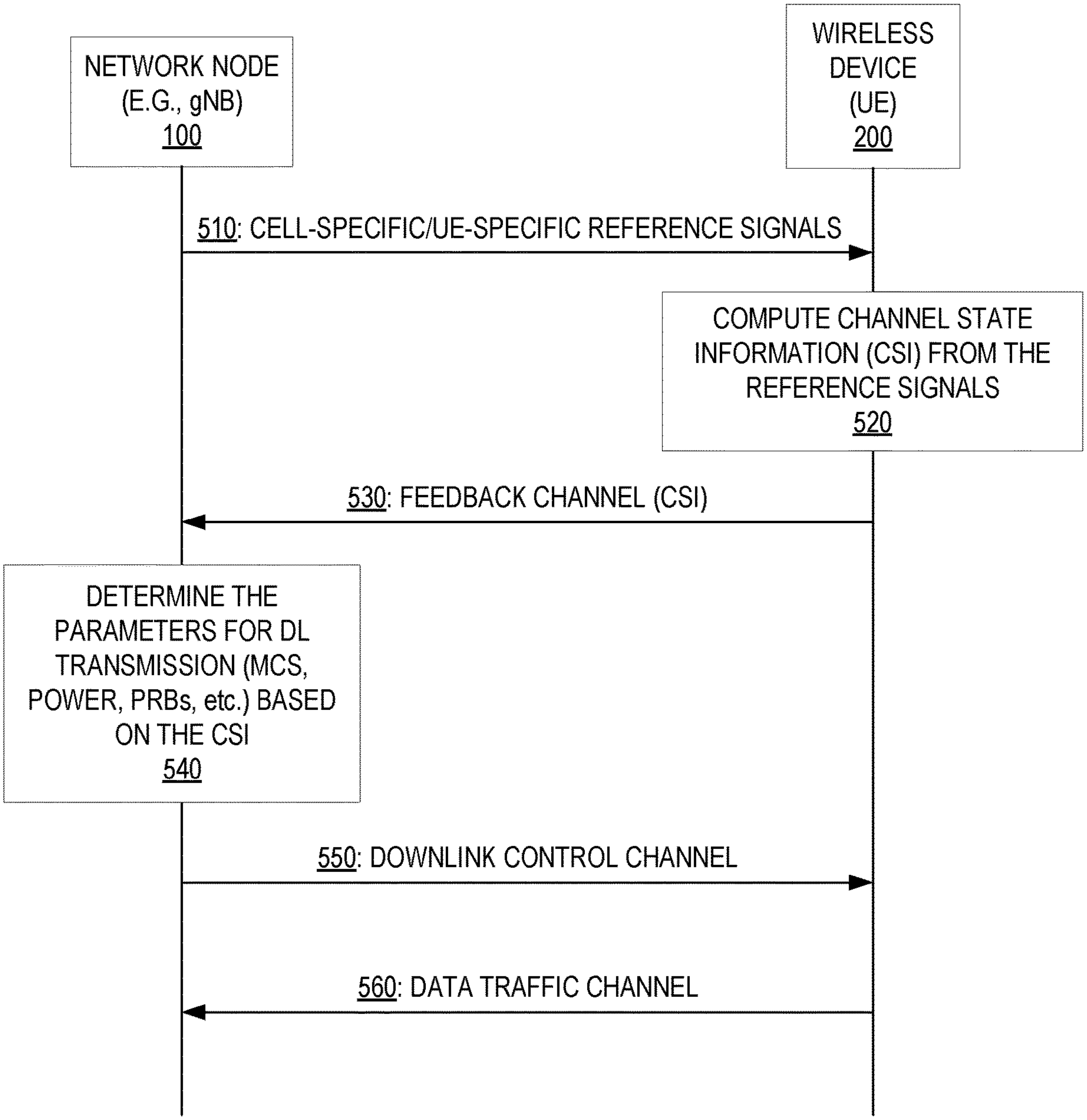
FIG. 1 shows an exemplary message sequence chart for downlink (DL) data transfer in 5G systems.

FIG. 1 shows an exemplary message sequence chart for downlink (DL) data transfer in 5G systems. From the pilot or reference signals (step 510), the UE 200 computes the channel estimates, and then computes the parameters needed for CSI (Channel State Information) reporting (step 520). The CSI report includes, e.g., Channel Quality Indicator (CQI), Precoding Matrix Index (PMI), Rank Information (RI) CSI-RS Resource Indicator (CRI, e.g., the same as beam indicator), etc. The UE 200 sends the CSI report to the network, e.g., to the gNB 100, via a feedback channel either on request from the network a-periodically or periodically, as configured (step 530). The network scheduler uses the received CSI information in choosing the parameters for scheduling this particular UE 200 (step 540). The network node 100 sends the scheduling parameters to the UE 200 via the DL control channel (step 550). Subsequently, the actual data transfer takes place from the network node 100 to the UE 200 (step 560).

DL reference signals comprise predefined signals occupying specific resource elements within the downlink time—frequency grid. There are several types of DL reference signals that are transmitted in different ways and used for different purposes by the receiving terminal:

- CSI reference signals (CSI-RS): CSI-RSs are specifically intended to be used by wireless terminals to acquire CSI and beam-specific information, e.g., beam Reference Signal Receive Power (RSRP). In 5G, a CSI-RS is UE-specific so it can have a significantly lower time/frequency density.
- Demodulation reference signals (DM-RS): DM-RSs, which are also sometimes referred to as UE-specific reference signals, are specifically intended to be used by wireless terminals for channel estimation for data channel. The label "UE-specific" relates to the fact that each demodulation reference signal is intended for channel estimation by a specific terminal. That specific reference signal is then only transmitted within the resource blocks assigned for data traffic channel transmission to that terminal.

In addition to CSI-RSs and DM-RSs, there are other reference signal positioning reference signals used various purposes which are not discussed further herein as they are not relevant to the solution presented herein.

The DL control channel, e.g., Physical Downlink Control CHannel (PDCCH), carries Downlink Control Information (DCI) about scheduling grants for each UE 200. Typically, the scheduling information includes a number of MIMO layers scheduled, transport block sizes, modulation for each codeword, parameters related to Hybrid Automatic ReQuest (HARQ), sub-band locations, Precoding Matrix Indicator (PMI) corresponding to the sub-bands, etc. 5G specifies different DCI formats for different DCSs, where all DCI formats may not include all the above-specified information. In general, the contents of the PDCCH depends on the transmission mode and the DCI format.

The uplink control channel, e.g., Physical Uplink Control CHannel (PUCCH), carries information about HARQ-ACK information corresponding to the DL data transmission and CSI. The CSI typically includes CSI Resource Indicator (CRI), Rank Indicator (RI), Channel Quality Indicator (CQI), PMI, etc. 3GPP NR defines five formats of PUCCH for reporting HARQ-ACK, Scheduling Request (SR), and CSI. Table 1 summarizes the characteristics of each of these five PUCCH formats, where "CP" represents Cyclic Prefix and "OFDM" represents Orthogonal Frequency Division Multiplexing.

TABLE 1

PUCCH Formats for NR

| Format name | Alternative name | Symbol length | Waveform | Information |
|---|---|---|---|---|
| Format 0 | Short PUCCH (≤2 bits) | 1-2 symbols | CP-OFDM | HARQ-ACK, SR |
| Format 1 | Long PUCCH (≤2 bits) | 4-14 symbols | CP-OFDM | HARQ-ACK, SR |
| Format 2 | Short PUCCH (>2 bits) | 1-2 symbols | CP-OFDM | HARQ-ACK, CSI |
| Format 3 | Long PUCCH (>2 bits) | 4-14 symbols | DFT-s-OFDM | HARQ-ACK, CSI |
| Format 4 | Long PUCCH (>2 bits) | 4-14 symbols | DFT-s-OFDM | HARQ-ACK, CSI |

Existing 4G LTE systems support broadcast and multicast transmissions over a wide area using either a Single Frequency Network (SFN) or a Single-Cell Point-To-Multipoint (SC-PTM) operating mode, under the current moniker of Multimedia Broadcast Multicast Service (MBMS). Specifically, in Multicast Broadcast Single Frequency Network (MBSFN), Base Stations (BSs) across multiple cells transmit the same data in the same resource block over special frames dedicated to MBMS services. Alternatively, in SC-PTM the same data is transmitted to multiple users in a single cell using a Physical Downlink Shared CHannel (PDSCH). Such broadcast/multicast features are expected to soon be supported also in 5G NR access technology to support various 5G use cases, e.g., public safety, emergency services, Internet of Things (IoT) software upgrades, etc.

The current 5G NR specification is designed primarily for unicast transmission, where each UE 200 feeds back the CSI to the network node 100 based on the reference signals, e.g., the CSI-RS. By leveraging the CSI feedback, the network node 100 sends data to the UE 200 over the PDSCH, along with the corresponding Physical Downlink Control CHannel (PDCCH) and DM-RS. The UE 200 processes the received signal and indicates the decoding status via an ACK or a NAK sent to the network node 100 over the uplink control channel. Based on the configuration, the UE 200 sends the HARQ-ACK and/or CSI according to the configured PUCCH format.

The same approach used for 5G unicast transmissions may also be used for broadcast/multicast transmissions. However, because a UE 200 can support both unicast and multicast transmissions, there are instances when the network may schedule both unicast and multicast transmissions. For example, when the UE 200 uses a broadcast service to watch a sports event, the UE 200 may also allow the user to browse the web. In these cases, the network node 100 schedules both the unicast and broadcast transmissions to the same UE 200, where the unicast ACK/NAK approach won't work because the network node 100 does not know whether the HARQ-ACK is for the unicast transmission or for the multicast transmission. That is, if there is an overlapping transmission of HARQ-ACK for the unicast and multicast transmissions, then the network node 100 is unable to differentiate between these two ACKs.

One potential solution to this problem is to configure different PUCCH resources for the unicast and multicast transmissions, where the UE 200 would use the unicast PUCCH resources to send acknowledgement feedback for the unicast transmission and would use the multicast PUCCH resources to send acknowledgement feedback for the multicast transmission. However, configuring separate PUCCH resources for unicast and multicast transmissions requires additional uplink resources, and is therefore inefficient in terms of resource utilization as these resources could otherwise be used for transmitting data, CSI, sounding reference signal (SRS), etc. The solution presented herein provides an alternative and more efficient solution for simultaneously providing the network node acknowledgement feedback for both the unicast and multicast transmissions, which allows the network node 100 to reduce the number of uplink resources for such feedback.

The solution presented herein facilitates the transmission of the acknowledgement feedback for both the unicast and multicast transmissions without increasing the overhead of the uplink control channel. To that end, the UE 200 uses the same PUCCH format and resources for multicast transmission as used for unicast transmission. However, in the time slots where the UE 200 is supposed to transmit acknowledgement feedback for both unicast and multicast transmissions, the UE 200 uses different cyclic shifts of a base sequence to represent different acknowledgement feedback. For example, the UE 200 may use different cyclic shifts of a Constant Amplitude Aero AutoCorrelation (CAZAC) base sequence to represent different acknowledgement feedback, e.g., one cyclic shift to represent an ACK for both the unicast and multicast transmissions, but a different cyclic shift to represent a unicast ACK and a multicast NAK. As a result, the UE 200 is able to provide the network node 100 with differentiable acknowledgement feedback for both the unicast and multicast transmissions, while also using the same number of uplink channel resources as used to report the acknowledgement feedback for unicast transmissions or for multicast transmissions.

Figure 2:
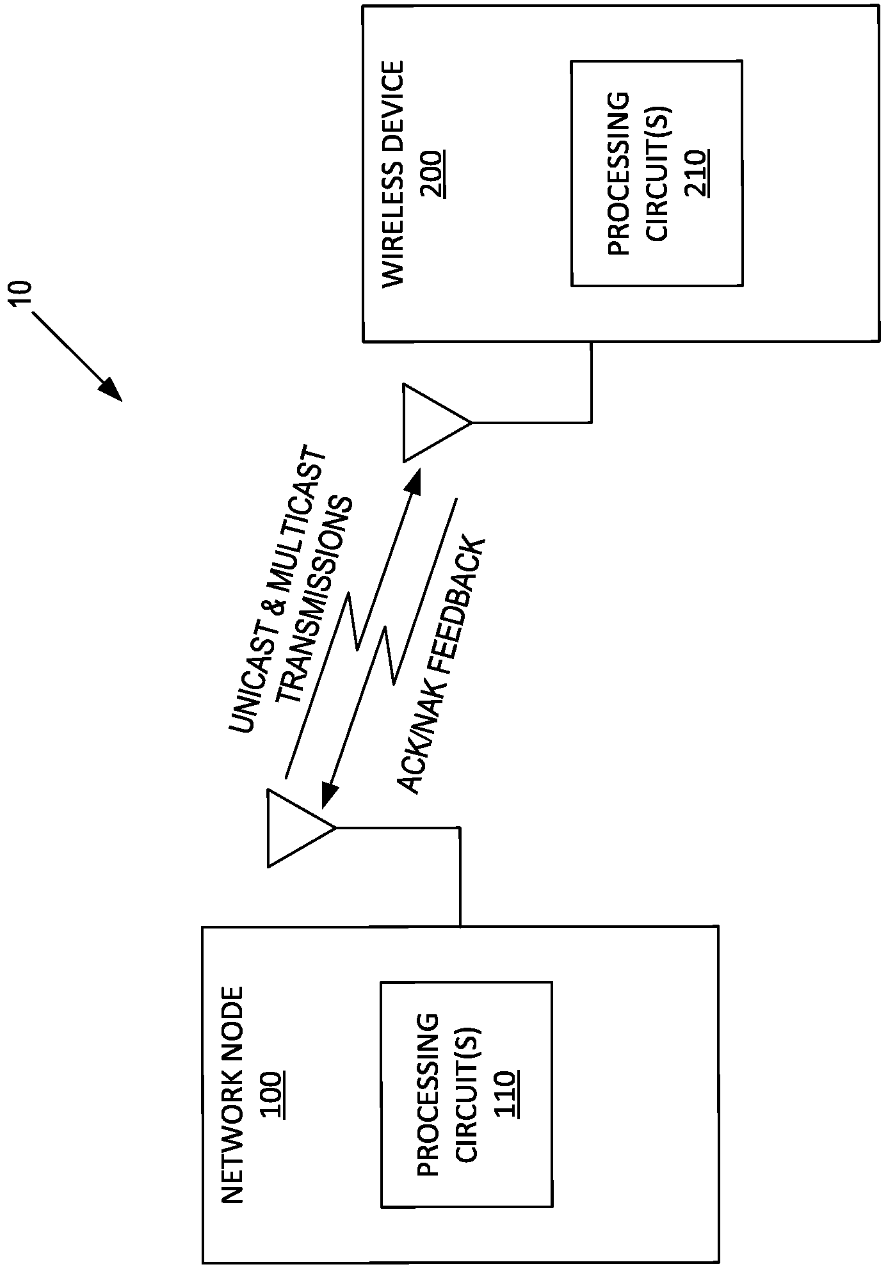
FIG. 2 shows a block diagram of an exemplary wireless network according to embodiments of the solution presented herein.

FIG. 2 shows a block diagram of an exemplary wireless network 10 comprising a network node 100 and a wireless device 200, each of which comprises one or more respective processing circuits 110, 210. The network node 100 sends unicast and/or multicast transmissions to the wireless device 200. In response, the wireless device 200 sends acknowledgement feedback, e.g., ACK/NAK, to the network node 100 according to the solution presented herein, where the wireless device 200 is configured to use the same uplink channel resources for simultaneously sending acknowledgement feedback for both unicast and multicast transmissions. While the solution presented herein is described in terms of wireless network 10 comprising a 5G NR system, it will be appreciated that the solution presented herein is applicable to any Radio Access Technology (RAT), e.g., 6G or multi-RAT systems where the UE 200 operates using multiple carriers, e.g., LTE Frequency Division Duplexing/Time Division Duplexing (FDD/TDD), Global System for Mobile communications (GSM)/GSM Enhanced Data rates for GSM Evolution (EDGE) Radio Access Network (GERAN), Wi Fi, Wireless Local Area Network (WLAN), etc. The solution presented herein is described in terms of a radio network node or network node 100, which refers to any type of network node that serves the wireless device 200 and/or is connected to other network nodes or network elements or any radio node from where the wireless device 200 receives signals. Examples of a radio network node include, but are not limited to, a gNode B (gNB), a Base Station (BS), a Multi-Standard Radio (MSR) node, e.g., MSR BS, an eNode B (eNB), a network controller, a Radio Network Controller (RNC), a Base Station Controller (BSC), a relay, a donor node controlling relay, a Base Transceiver Station (BTS), an Access Point (AP), a transmission point, a transmission node, a Remote Radio Unit (RRU), a Remote Radio Head (RRH), a node in a Distributed Antenna System (DAS), etc. Further, the solution presented herein is described in terms of a wireless device or User Equipment (UE) 200, which refers to any type of wireless device 200 that communicates with a radio network node in a cellular or mobile communication system or network. Examples of a wireless device or UE 200 include, but are not limited to, a target device, a Device-to-Device (D2D) UE, a machine-type UE or a UE capable of Machine-to-Machine (M2M) communication, a Personal Digital Assistant (PDA), an iPAD, a Tablet, a mobile terminal, a smart phone, a Laptop Embedded Equipment (LEE), a Laptop Mounted Equipment (LME), Universal Serial Bus (USB) dongles, etc. The solution presented herein is applicable to single carrier as well as to multicarrier (MC) or carrier aggregation (CA) operation of the UE 200. The term carrier aggregation (CA) may also be referred to as "multi-carrier system," "multi-cell operation," "multi-carrier operation," or "multi-carrier" transmission and/or reception. Note that the solution presented herein equally applies for Multi RAB (radio bearers) on some carriers, e.g., data plus speech that is simultaneously scheduled.

Figure 3:
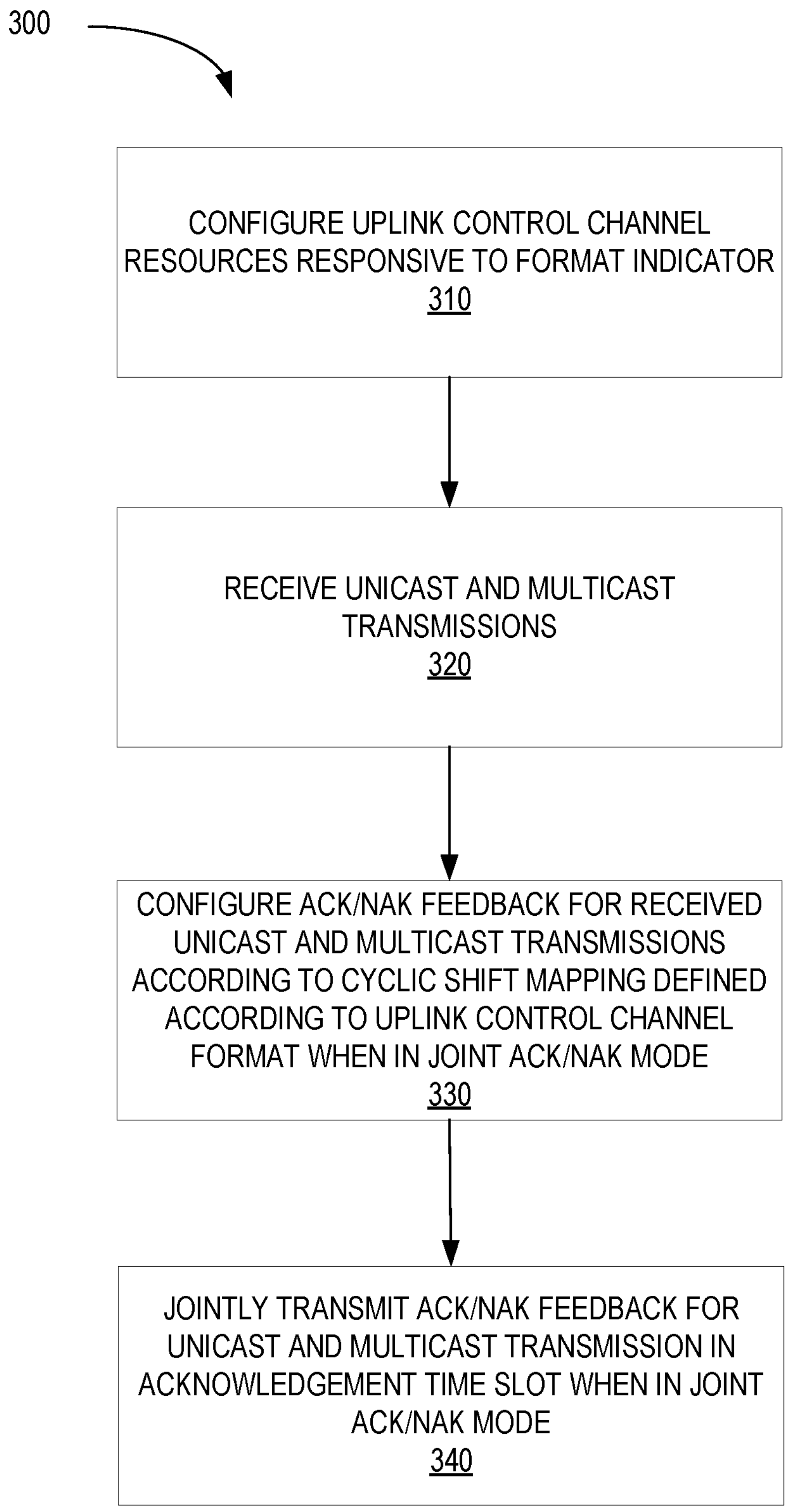
FIG. 3 shows an exemplary method implemented by a wireless device according to embodiments of the solution presented herein.

Wireless device 200 comprises one or more processing circuits 210 configured to execute the method 300 of FIG. 3. The method 300 comprises the wireless device 200 configuring uplink control channel resources responsive to an uplink channel format indicated by an uplink channel format indicator, where each possible ACK or NAK combination for the unicast and multicast transmissions maps to a different cyclic shift of a base sequence defined according to the uplink control channel format (block 310). The method 300 further comprises the wireless device 200 receiving a unicast transmission and a multicast transmission (block 320). When in a joint acknowledgement mode, the method 300 comprises the wireless device 200 configuring acknowledgement feedback for the received unicast and multicast transmissions according to the cyclic shift mapping (block 330), and jointly transmitting the acknowledgement feedback for both the received unicast transmission and the received multicast transmission to the network node 100 in an acknowledgement time slot (block 340). In one embodiment of the solution presented herein, the wireless device 200 is configured to operate in the joint acknowledgement mode any time the wireless device 200 is expected to provide acknowledgement feedback for both unicast and multicast transmissions. It will be appreciated however, as discussed further below, that other circumstances and/or network conditions may dictate when the wireless device 200 operates in the joint acknowledgement mode.

Figure 4:
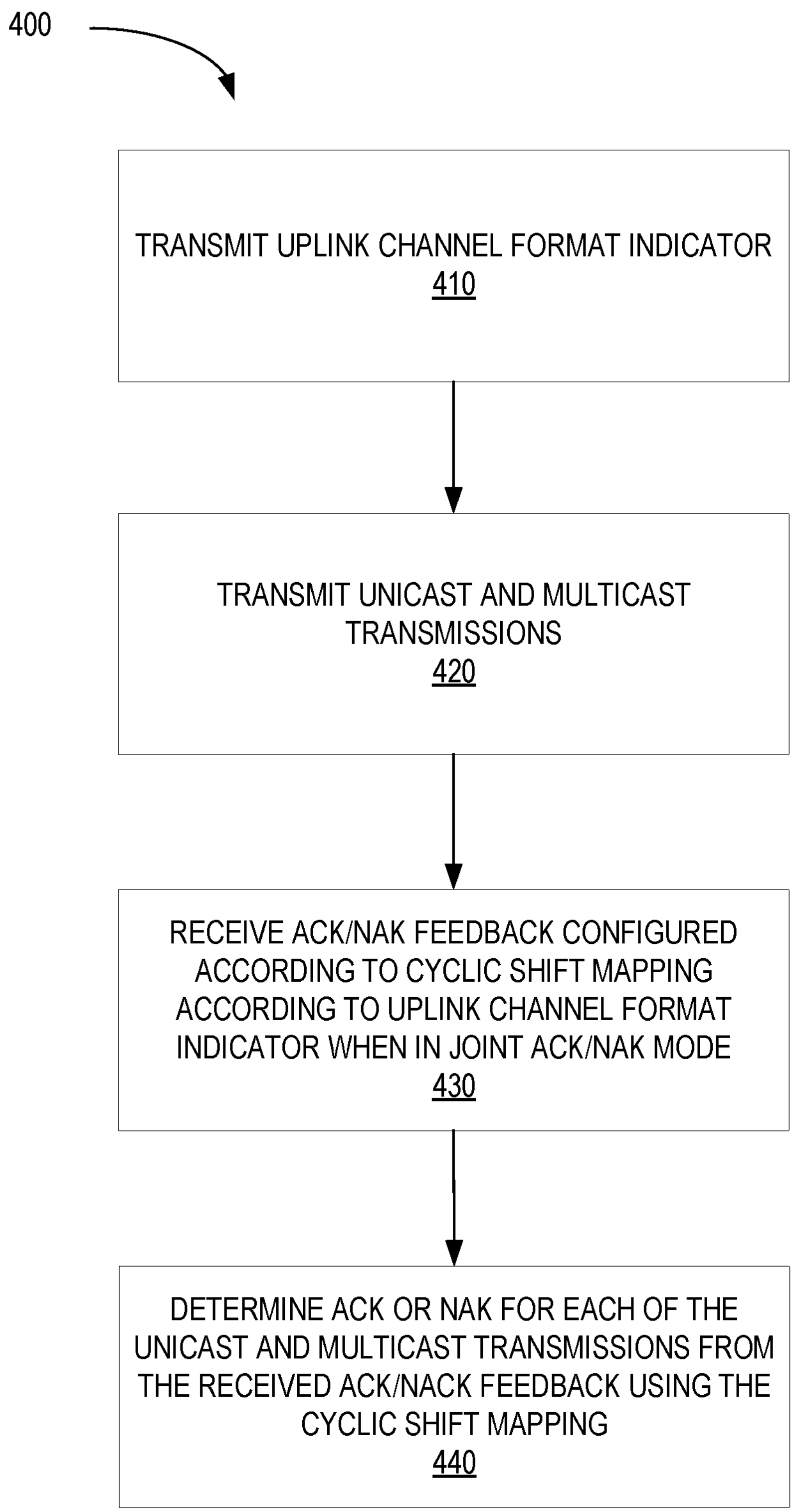
FIG. 4 shows an exemplary method implemented by a network node according to embodiments of the solution presented herein.

Network node 100 comprises one or more processing circuits 110 configured to execute the method 400 of FIG. 4. The method 400 comprises the network node 100 transmitting an uplink channel format indicator to the wireless device 200 to indicate an uplink channel format for uplink control channel resources (block 410), and transmitting a unicast transmission, and a multicast transmission to the wireless device 200 (block 420). When the wireless device 200 is configured in a joint acknowledgement mode, the method 400 further comprises the network node 100 receiving acknowledgement feedback from the wireless device 200 for the transmitted unicast and multicast transmissions (block 430). The acknowledgement feedback is configured according to a cyclic shift mapping that maps each possible combination of ACK or NAK for the unicast and multicast transmissions to a different cyclic shift of a base sequence defined according to the uplink control channel format indicator. When the wireless device 200 is configured in the joint acknowledgement mode, the method 400 further comprises the network node 100 determining an ACK or a NAK for the unicast transmission from the received acknowledgement feedback using the cyclic shift mapping (block 440) and determining an ACK or a NAK for the multicast transmission from the received acknowledgement feedback using the cyclic shift mapping (block 440).

Figure 5:
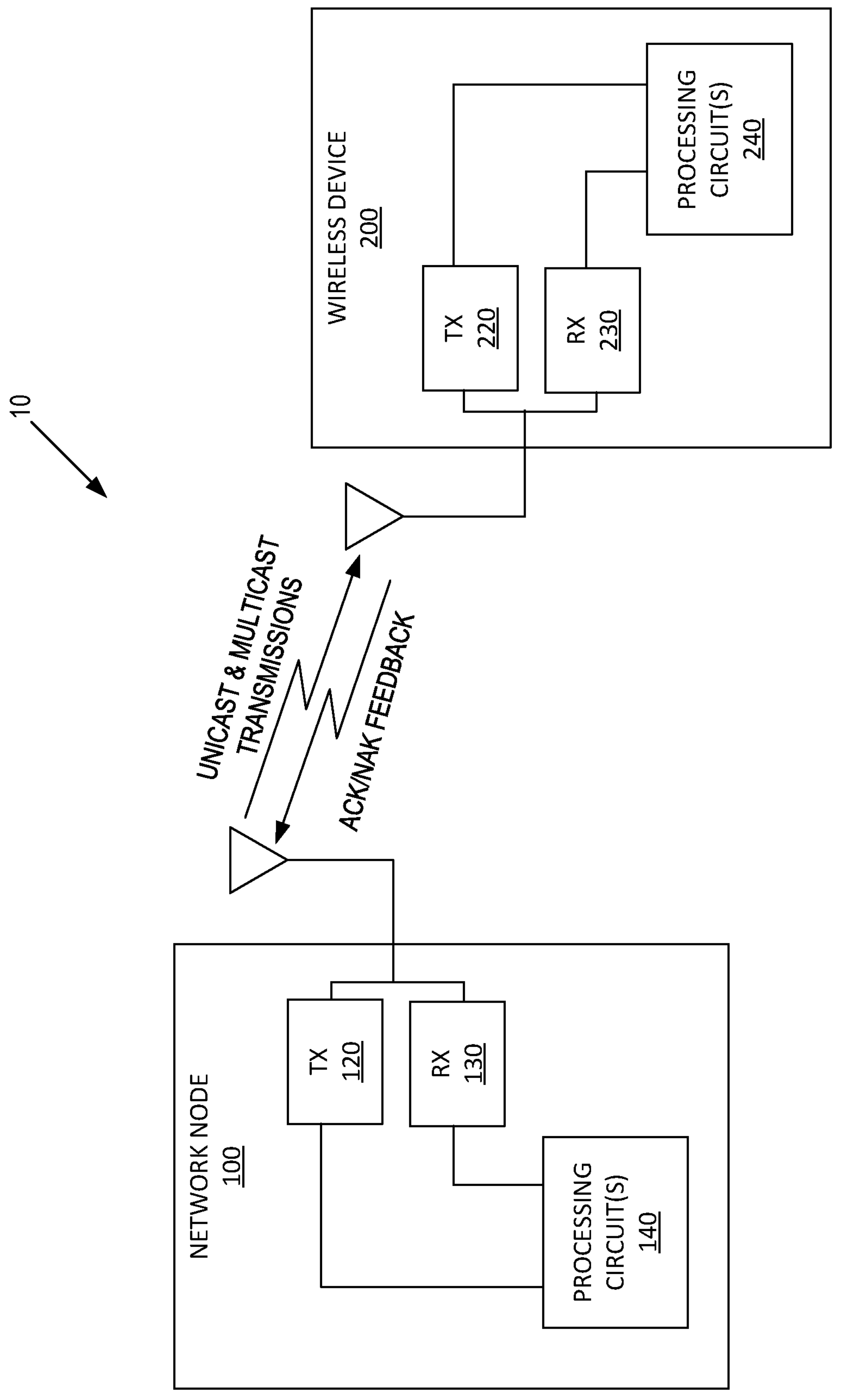
FIG. 5 shows a block diagram of another exemplary wireless network according to embodiments of the solution presented herein.

While the above describes the solution presented herein in terms of one or more processing circuits 110, 210 of the respective network node 100 and wireless device 200, FIG. 5 shows an alternate block diagram where the network node 100 and wireless device 200 comprise additional circuitry used to implement the corresponding methods. More particularly, network node 100 comprises a transmitter 120, receiver 130, and one or more processing circuits 140. The transmitter 120 is configured to transmit an uplink channel format indicator to the wireless device 200 to indicate an uplink channel format for uplink control channel resources, and to transmit a unicast transmission and a multicast transmission to the wireless device 200. The receiver 130 is configured to, when the wireless device 200 is configured in a joint acknowledgement mode, receive acknowledgement feedback from the wireless device 200 for the transmitted unicast and multicast transmissions, said acknowledgement feedback configured according to a cyclic shift mapping that maps each possible combination of ACK or NAK for the unicast and multicast transmissions to a different cyclic shift of a base sequence defined according to the uplink control channel format indicator. The one or more processing circuits 140, when the wireless device 200 is configured in the joint acknowledgement mode, are configured to determine an ACK or a NAK for the unicast transmission from the received acknowledgement feedback using the cyclic shift mapping, and determine an ACK or a NAK for the multicast transmission from the received acknowledgement feedback using the cyclic shift mapping. Further, wireless device 200 comprises a transmitter 220, receiver 230, and one or more processing circuits 240. The receiver 230 is configured to simultaneously receive a unicast transmission and a multicast transmission from the network node 100. The one or more processing circuits 240 are configured to configure uplink control channel resources responsive to an uplink channel format indicated by an uplink channel format indicator, where each combination of ACK or NAK for the unicast and multicast transmissions maps to a different cyclic shift of a base sequence defined according to the uplink control channel format. When in a joint acknowledgement mode, the one or more processing circuits 240 are further configured to configure acknowledgement feedback for the received unicast and multicast transmissions according to the cyclic shift mapping. The transmitter 120 is configured to, when in the joint acknowledgement mode, jointly transmit the acknowledgement feedback for both the received unicast transmission and the received multicast transmission to the network node 100 in an acknowledgement time slot.

As generally discussed above, the solution presented herein configures the wireless device 200 with the same PUCCH format for both unicast and multicast resources. The acknowledgement feedback provided by the wireless device 200 for a particular feedback time slot, however, depends on the scheduled transmission(s) received by the wireless device 200. For example, if the wireless device 200 is scheduled only with a unicast transmission, the wireless device 200 transmits the acknowledgement feedback on the PUCCH resources indicated in the PUCCH format indicator. Similarly, if the wireless device 200 is scheduled only with a broadcast or multicast transmission, the wireless device 200 transmits the acknowledgement feedback on the PUCCH resources indicated in the PUCCH format indicator. However, if the network schedules simultaneous unicast and multicast transmissions and requests that the wireless device 200 provide the acknowledgement feedback for both in the same feedback timeslot, then the wireless device 200, according to the solution presented herein, transmits joint acknowledgement feedback by using different cyclic shifts of the same base sequence, e.g., a CAZAC sequence.

In one exemplary embodiment, a PUCCH format 0 dictates the PUCCH resources used by the wireless device 200. In this exemplary embodiment, the network node 100 configures the wireless device 200 with an initial cyclic shift ($m_{cs}$=0) of a base sequence, e.g., a CAZAC sequence, a number of OFDM symbols for PUCCH transmission, and a starting symbol index for PUCCH transmission using higher layer signaling. Accordingly, in the time slots where the acknowledgement feedback for either unicast or multicast transmission is needed, the wireless device 200 operates in a separate acknowledgement mode, which uses a sequence cyclic shift according to Table 2 to define the acknowledgement feedback sent to the network node 100.

TABLE 2

| Mapping for PUCCH format 0 for separate acknowledgement mode | | |
|---|---|---|
| HARQ-ACK value | Unicast/Multicast ACK | Unicast/Multicast NAK |
| Sequence cyclic shift | $m_{cs}$ = 0 | $m_{cs}$ = 6 |

However, when the wireless device 200 is scheduled to receive both unicast and multicast transmissions and is requested to transmit the corresponding acknowledgement feedback jointly, the wireless device 200 uses the cyclic shift of Table 3 to define the acknowledgement feedback sent to the network node 100.

TABLE 3

Mapping for PUCCH format 0 for joint acknowledgement mode

| HARQ-ACK value | Unicast ACK and Multicast ACK | Unicast NAK and Multicast ACK | Unicast ACK and Multicast NAK | Unicast NAK and Multicast NAK |
|---|---|---|---|---|
| Sequence cyclic shift | $m_{cs} = 0$ | $m_{cs} = 3$ | $m_{cs} = 6$ | $m_{cs} = 9$ |

Because the sequence length is same for both the cases, the number of PUCCH resources used for transmitting HARQ-ACK doesn't increase when the wireless device 200 transmits joint HARQ-ACK information for the unicast and multicast transmissions. It will be appreciated that the example of Tables 2 and 3 also applies for PUCCH format 1. It will further be appreciated that the mappings of Tables 2 and 3 are exemplary; other mappings may be used within the scope of the solution presented herein.

The above example is for PUCCH formats 0 and 1. However, the solution presented herein also applies to other PUCCH formats where unicast is already using a specific PUCCH format. For example, if the PUCCH format uses a base sequence of raw bits (e.g., PUCCH format 2, 3 and 4), then the HARQ-ACK may be configured as shown in Table 4 and 5.

TABLE 4

Mapping for PUCCH format 2, 3, 4 for separate mode

| HARQ-ACK value | Unicast/Multicast ACK | Unicast/Multicast NAK |
|---|---|---|
| Bits | 0 | 6 |

TABLE 5

Mapping for PUCCH format 2, 3, 4 for joint mode

| HARQ-ACK value | Unicast ACK and Multicast ACK | Unicast NAK and Multicast ACK | Unicast ACK and Multicast NAK | Unicast NAK and Multicast NAK |
|---|---|---|---|---|
| Bits with shift | 00 | 01 | 10 | 11 |

It will be appreciated that the mappings of Tables 4 and 5 are exemplary; other mappings may be used within the scope of the solution presented herein.

As explained herein, the network node 100 configures the wireless device 200 with the same PUCCH resources for transmitting HARQ-ACK information for multicast transmissions as used for unicast transmissions. However, when a joint transmission of acknowledgement feedback for both the unicast and multicast transmissions is requested, e.g., when the wireless device 200 is in a joint acknowledgement mode, the wireless device 200 uses the cyclic shift of the base sequence to transmit the joint feedback. In one exemplary embodiment, the network node 100 and the wireless device know the cyclic shifts of the base sequence to use for the joint acknowledgement feedback. For example, the standard may specify the cyclic shifts. In another exemplary embodiment, the network node 100 can configure the additional cyclic shifts for simultaneous acknowledgement feedback, e.g., via downlink control channel signaling sent from the network node 100 to the wireless device 200.

In another exemplary embodiment, the reliability of the joint acknowledgement feedback may be improved by boosting the power of the PUCCH during transmission of the acknowledgement feedback. In so doing, wireless device 200 may compensate for a potential small degradation in performance caused by the additional cyclic shifts. For example, the network node 100 may indicate a boost for the power of the control channel for transmission of the joint acknowledgement feedback. In this way the performance of the PUCCH is the same irrespective of whether the wireless device 200 sends a unicast or multicast acknowledgement feedback, or whether the wireless device 200 sends joint unicast and multicast acknowledgement feedback. In one exemplary embodiment, the network node 100 boosts the PUCCH power by sending power control information dynamically, e.g., via Downlink Control Information (DCI). In another exemplary embodiment, the network node 100 and the wireless device 200 may have a common understanding of the appropriate power boost.

As explained herein for multicast transmissions, the network node 100 configures the wireless device 200 with the same PUCCH resources for transmitting acknowledgement feedback for the multicast transmission as used for unicast transmissions. However, for the joint transmission of acknowledgement feedback, the wireless device 200 uses a particular cyclic shift of a base sequence to transmit the joint feedback, e.g., as shown in Table 3 or Table 5. The solution presented herein may be further modified to apply this joint acknowledgement feedback only under certain circumstances, e.g., certain network loads or responsive to a certain network performance. For example, when the network load is low, the wireless device 200 may instead be configured in a separate acknowledgement mode, where separate PUCCH resources are used for the acknowledgement feedback for each of the unicast and multicast transmissions. That is, the network node 100 may configure the wireless device 200 using Radio Resource Control (RRC) signaling when the network load is low, e.g., less than a threshold. However, when the network load is high, e.g., greater than or equal to the threshold, the network node 100 may configure the wireless device 200 to use the same PUCCH resources for unicast and multicast acknowledgement as discussed herein. It will be appreciated that the wireless device 200 may alternatively make the consideration regarding whether to operate in the separate or joint acknowledgement mode, e.g., the wireless device 200 may evaluate the load or other network performance parameter. In any event, the separate/joint acknowledgement mode consideration may be implemented periodically (e.g., every n slots, every t time, etc.), may be implemented on command, and/or may be implemented for every ACK/NAK feedback. Further, even if the network 10 is configured to make the consideration regarding the separate/joint acknowledgement mode one way, e.g., periodically, the solution presented herein also enables the network 10 to make this consideration another way, e.g., on command, if needed.

Figure 6:
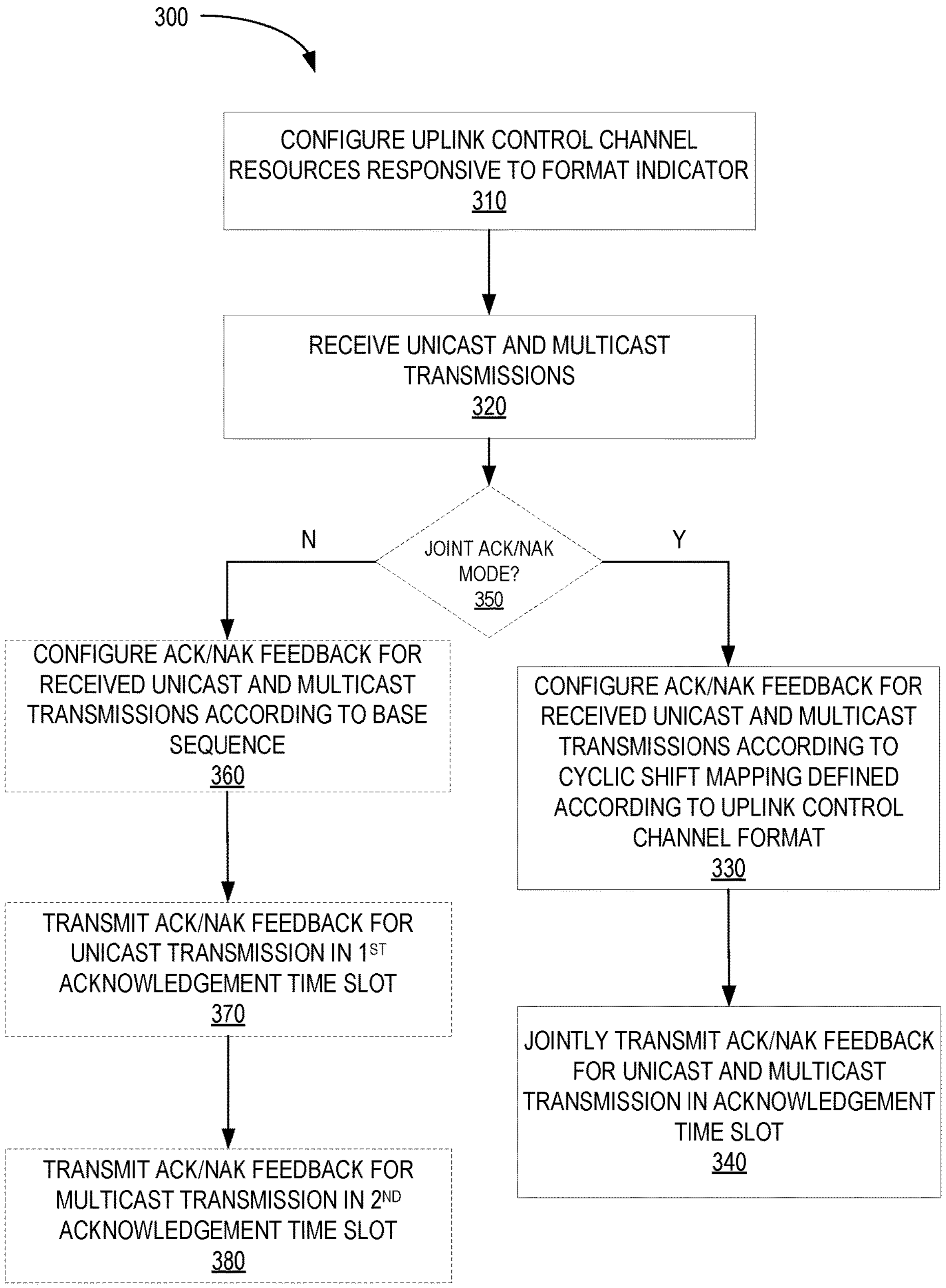
FIG. 6 shows an exemplary method implemented by a network node according to embodiments of the solution presented herein.

FIG. 6 shows an exemplary method 300 that includes the acknowledgement mode decision, where reference numbers for like steps from FIG. 3 are repeated in FIG. 6. In FIG. 6, the method 300 comprises the wireless device 200 configuring uplink control channel resources responsive to an uplink channel format indicated by an uplink channel format indicator, where each possible ACK or NAK combination for the unicast and multicast transmissions maps to a different cyclic shift of a base sequence defined according to the uplink control channel format (block 310). The method 300 further comprises the wireless device 200 receiving a unicast transmission and a multicast transmission (block 320). The wireless device 200 then determines which acknowledgement mode it should operate in. This determination may be made based on control information from the network node 100 and/or based on network performance determinations made by the wireless device 200. If the wireless device 200 determines a joint acknowledgement mode (block 350), the wireless device configures acknowledgement feedback for the received unicast and multicast transmissions according to the cyclic shift mapping (block 330), and jointly transmits the acknowledgement feedback for both the received unicast transmission and the received multicast transmission to the network node 100 in an acknowledgement time slot (block 340). If the wireless device 200 determines a separate acknowledgement mode (block 350), the wireless device 200 configures acknowledgement feedback for the received unicast and multicast transmissions according to the base sequence (block 360). Subsequently, the wireless device 200 transmits the acknowledgement feedback for the received unicast transmission to the network node 100 in a first acknowledgement time slot (block 370), and transmits the acknowledgement feedback for the received multicast transmission to the network node 100 in a second acknowledgement time slot (block 380). It will be appreciated that the performance parameters required to make the acknowledgement mode determination may be evaluated periodically (e.g., every few slots, every second, every 10 seconds, etc.), on command, or each time acknowledgement feedback is required for both a unicast and a multicast transmission.

Figure 7:
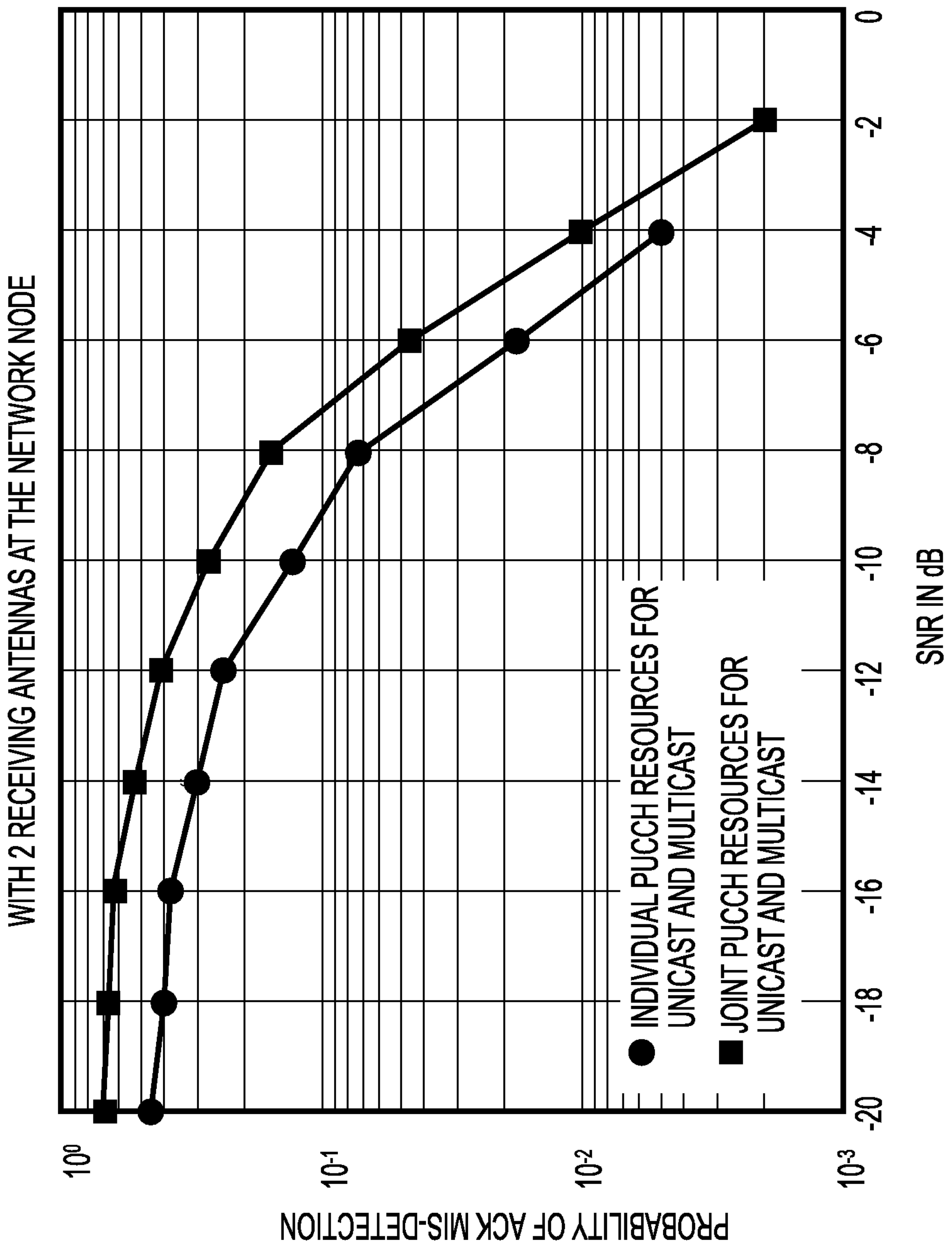
FIG. 7 shows simulation results for exemplary embodiments of the solution presented herein.
Figure 8:
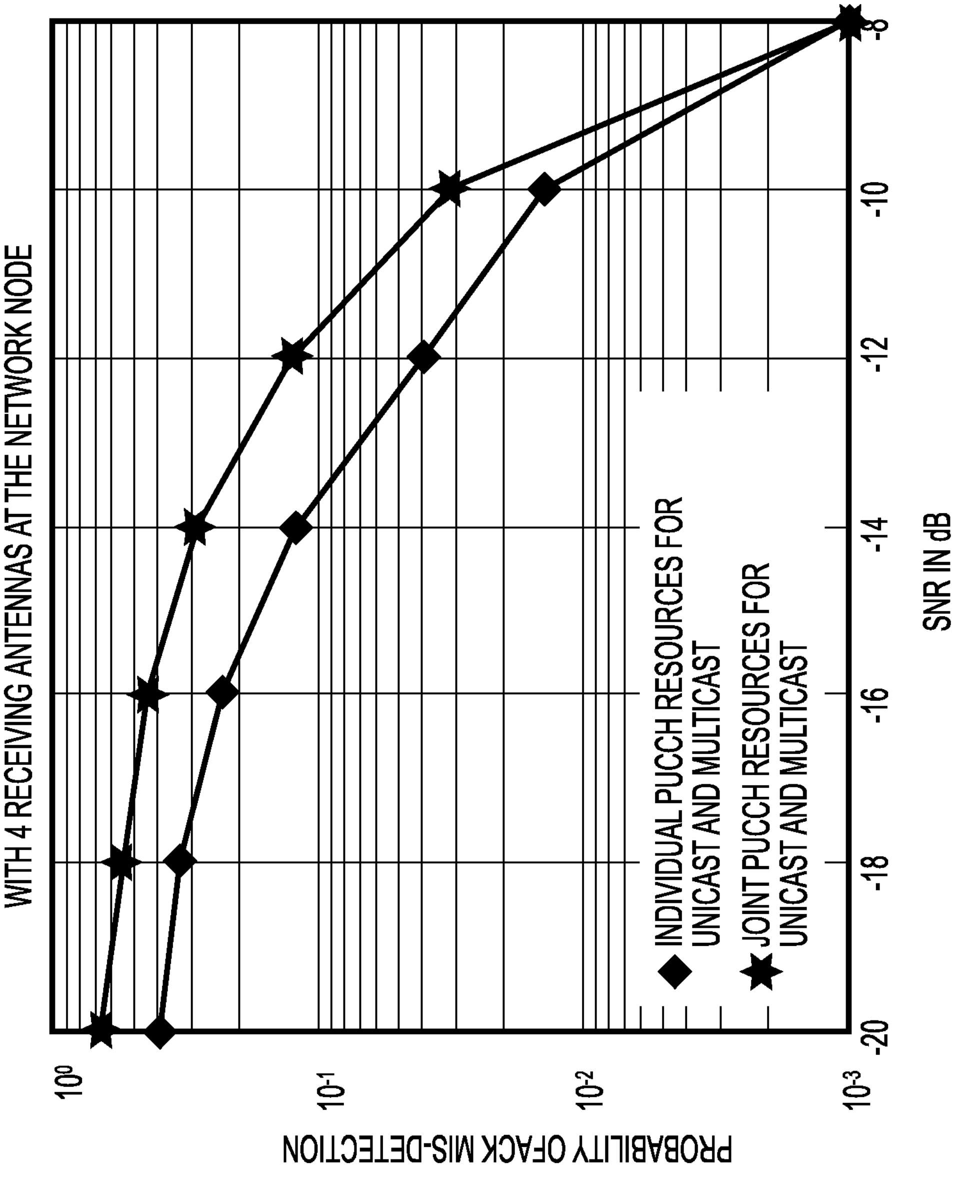
FIG. 8 shows simulation results for exemplary embodiments of the solution presented herein.

FIGS. 7 and 8 show simulation results that demonstrate the extent that the joint transmission of acknowledgement feedback for both unicast and multicast transmissions on the same PUCCH resource performs relative to transmitting acknowledgement feedback for each on separate PUCCH resources. Table 6 shows the link simulation settings used to produce the simulation results of FIGS. 7 and 8.

TABLE 6

| Link Parameter | Value |
|---|---|
| Carrier Frequency | 2 GHz |
| System Bandwidth | 10 MHz |
| Slot Length | 1 ms |
| Subcarrier Spacing | 15 kHz |
| FFT Size | 1024 |
| Channel Model | TDL-A, 3 kmph |
| Antenna Configuration | 1 TX antenna, 2 or 4 RX antennas |
| Receiver | Sequence Detection |
| PUCCH Format | 0 |

FIGS. 7 and 8 show the probability of HARQ-ACK misdetection for both separate resources and the same resource for unicast and multicast when the network node 100 is equipped with two receive antennas and four receive antennas, respectively, where sequence detection is used for choosing the HARQ-ACK. As seen in FIG. 6, at the $10^{-2}$ misdetection probability point, the gap between both curves is around 1 dB, which is satisfactory. As mentioned above, this performance gap may be further reduced by means of an uplink control channel power boost.

The solution presented herein provides methods to configure and transmit HARQ-ACK/NAK feedback corresponding to unicast and multicast reception in 5G NR or beyond cellular networks. Specifically, the UE 200 utilizes the same PUCCH format that is used for unicast to transmit HARQ-ACK of multicast on the overlapped resources, but using different cyclic shifts of the base sequence. The solution presented herein may therefore be considered to provide a method in the network node to configure wireless device with the same PUCCH resources for unicast and multicast transmissions for transmitting HARQ-ACK information. In exemplary embodiments, the wireless device is configured using RRC signal. In exemplary embodiments, the HARQ-ACK information from the wireless device uses two cyclic shifts for only unicast transmissions. In exemplary embodiments, the HARQ-ACK information from the wireless device uses two cyclic shifts for only multicast transmissions. In exemplary embodiments, the HARQ-ACK information from the wireless device uses four cyclic shifts for joint unicast and multicast transmissions. In exemplary embodiments, the network sends power control information for boosting the power when the wireless device is configured for joint unicast and multicast transmissions. The solution presented herein may further be considered to provide a method in the network node to configure wireless device with the different PUCCH resources for unicast and multicast transmissions for transmitting HARQ-ACK information based on the load of the cell.

Although the subject matter described herein may be implemented in any appropriate type of system using any suitable components, the embodiments disclosed herein are described in relation to a wireless network, such as the example wireless network illustrated in FIG. 2 or FIG. 5. For simplicity, the wireless network 10 only depicts network node 100 and wireless device 200. In practice, a wireless network 10 may further include any additional elements suitable to support communication between wireless devices or between a wireless device and another communication device, such as a landline telephone, a service provider, or any other network node or end device. Of the illustrated components, only the network node 100 and wireless device 200 are depicted with additional detail. The wireless network 10 may provide communication and other types of services to one or more wireless devices 200 to facilitate the wireless devices' access to and/or use of the services provided by, or via, the wireless network 10.

Note that the apparatuses described herein may perform the methods herein, and any other processing, by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For example, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein. Thus, various apparatus elements disclosed herein, e.g., a network node, a wireless device, processing circuit(s), receivers, transmitters, etc., may implement any functional means, modules, units, or circuitry, and may be embodied in hardware and/or in software (including firmware, resident software, microcode, etc.) executed on a controller or processor, including an application specific integrated circuit (ASIC).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended embodiments are intended to be embraced therein.

The invention claimed is:

1. A method of conveying acknowledgement feedback to a network node for unicast and multicast transmissions received by a wireless device, the method executed by the wireless device comprising:

configuring uplink control channel resources responsive to an uplink channel format indicated by an uplink channel format indicator, where each possible ACK or NAK combination for the unicast and multicast transmissions maps to a different cyclic shift of a base sequence defined according to the uplink control channel format;

receiving a unicast transmission and a multicast transmission;

when in a joint acknowledgement mode:

configuring acknowledgement feedback for the received unicast and multicast transmissions according to the cyclic shift mapping; and jointly transmitting the acknowledgement feedback for both the received unicast transmission and the received multicast transmission to the network node in an acknowledgement time slot, wherein the wireless device is configured to operate in the joint acknowledgement mode any time the wireless device is expected to provide acknowledgement feedback for both the received unicast transmission and the received multicast transmission.

2. The method of claim 1, wherein the base sequence comprises a Constant Amplitude Zero Autocorrelation (CAZAC) sequence, and wherein each of the possible combinations of ACK or NAK for the unicast and multicast transmissions maps to a different cyclic shift of the CAZAC sequence.

3. The method of claim 2, wherein each of the possible combinations of ACK or NAK for the unicast and multicast transmissions maps to the different cyclic shift of the CAZAC sequence by:

mapping an ACK for both the received unicast transmission and the received multicast transmission to a cyclic shift of 0 of the CAZAC sequence;

mapping a NAK for the received unicast transmission and an ACK for the received multicast transmission to a cyclic shift of 3 of the CAZAC sequence;

mapping an ACK for the received unicast transmission and a NAK for the received multicast transmission to a cyclic shift of 6 of the CAZAC sequence; and mapping a NAK for both the received unicast transmission and the received multicast transmission to a cyclic shift of 9 of the CAZAC sequence.

4. The method of claim 1, wherein the base sequence comprises two bits, and wherein each of the possible combinations of ACK or NAK for the unicast and multicast transmissions maps to a different cyclic shift of the two bits.

5. The method of claim 4, wherein each of the possible combinations of ACK or NAK for the unicast and multicast transmissions maps to the different cyclic shift of the two bits by:

mapping an ACK for both the received unicast transmission and the received multicast transmission to 00;

mapping a NAK for the received unicast transmission and an ACK for the received multicast transmission to 01;

mapping an ACK for the received unicast transmission and a NAK for the received multicast transmission to 10; and mapping a NAK for both the received unicast transmission and the received multicast transmission to 11.

6. The method of claim 1, further comprising boosting a power for the uplink control channel for the joint acknowledgement mode during the transmission of the acknowledgement feedback.

7. The method of claim 6, further comprising receiving power control information from the network node, wherein the boosting the power comprises boosting the power for the joint acknowledgement mode during transmission of the acknowledgement feedback responsive to the received power control information.

8. The method of claim 1, further comprising:

determining whether the operating mode of the wireless device is the joint acknowledgement mode or a separate acknowledgement mode;

wherein when in the separate acknowledgement mode, the method further comprises:

configuring acknowledgement feedback for each of the received unicast and multicast transmissions according to the base sequence;

transmitting the acknowledgement feedback for the received unicast transmission in a first acknowledgement time slot; and transmitting the acknowledgement feedback for the received multicast transmission in a second acknowledgement time slot different from the first acknowledgement time slot.

9. The method of claim 8, further comprising receiving a mode control signal from the network node, the mode control signal derived by the network node responsive to a load of the wireless network.

10. A wireless device in communication with a network node in a wireless network, the wireless device comprising:
- a receiver configured to simultaneously receive a unicast transmission and a multicast transmission from the network node;
- one or more processing circuits configured to:
  - configure uplink control channel resources responsive to an uplink channel format indicated by an uplink channel format indicator, where each combination of ACK or NAK for the unicast and multicast transmissions maps to a different cyclic shift of a base sequence defined according to the uplink control channel format; and
  - when in a joint acknowledgement mode, configure acknowledgement feedback for the received unicast and multicast transmissions according to the cyclic shift mapping, wherein the wireless device is configured to operate in the joint acknowledgement mode any time the wireless device is expected to provide acknowledgement feedback for both the received unicast transmission and the received multicast transmission; and
- a transmitter configured to, when in the joint acknowledgement mode, jointly transmit the acknowledgement feedback for both the received unicast transmission and the received multicast transmission to the network node in an acknowledgement time slot.

11. A method of receiving acknowledgement feedback at a network node from a wireless device for unicast and multicast transmissions to the wireless device, the method executed by the network node comprising:
- transmitting an uplink channel format indicator to the wireless device to indicate an uplink channel format for uplink control channel resources;
- transmitting a unicast transmission and a multicast transmission to the wireless device;
- when the wireless device is configured in a joint acknowledgement mode:
  - receiving acknowledgement feedback from the wireless device for the transmitted unicast and multicast transmissions, the acknowledgement feedback configured according to a cyclic shift mapping that maps each possible combination of ACK or NAK for the unicast and multicast transmissions to a different cyclic shift of a base sequence defined according to the uplink control channel format indicator;
  - determining an ACK or a NAK for the unicast transmission from the received acknowledgement feedback using the cyclic shift mapping; and
  - determining an ACK or a NAK for the multicast transmission from the received acknowledgement feedback using the cyclic shift mapping, wherein the wireless device is configured, when in the joint acknowledgement mode, to jointly transmit acknowledgement feedback for both the received unicast transmission and the received multicast transmission in an acknowledgement time slot.

12. The method of claim 11, wherein the base sequence comprises a Constant Amplitude Zero Autocorrelation (CAZAC) sequence, and wherein each of the possible combinations of ACK or NAK for the unicast and multicast transmissions maps to a different cyclic shift of the CAZAC sequence.

13. The method of claim 12, wherein the determining the ACK or the NAK for the unicast and multicast transmissions comprises:
- determining an ACK for both the unicast transmission and the multicast transmission when the CAZAC sequence has a cyclic shift of 0;
- determining a NAK for the unicast transmission and an ACK for the multicast transmission when the CAZAC sequence has a cyclic shift of 3;
- determining an ACK for the unicast transmission and a NAK for the multicast transmission when the CAZAC sequence has a cyclic shift of 6; and
- determining a NAK for both the unicast transmission and the multicast transmission when the CAZAC sequence has a cyclic shift of 9.

14. The method of claim 11, wherein the base sequence comprises two bits, and wherein each of the possible combinations of ACK or NAK for the unicast and multicast transmissions maps to a different cyclic shift of the two bits.

15. The method of claim 14, wherein the determining the ACK or NAK for the unicast and multicast transmission comprises:
- determining an ACK for both the unicast transmission and the multicast transmission when the received acknowledgement feedback comprises 00;
- determining a NAK for the unicast transmission and an ACK for the multicast transmission when the received acknowledgement feedback comprises 01;
- determining an ACK for the unicast transmission and a NAK for the multicast transmission when the received acknowledgement feedback comprises 10; and
- determining a NAK for both the unicast transmission and the multicast transmission when the received acknowledgement feedback comprises 11.

16. The method of claim 11, further comprising transmitting power control information to the wireless device instructing the wireless device to boost an uplink control channel power for the joint acknowledgement mode during transmission of the acknowledgement feedback.

17. The method of claim 11, further comprising:
- determining a load of a wireless network comprising the network node and the wireless device;
- configuring the wireless device to operate in the joint acknowledgement mode when the load of the wireless network exceeds a threshold; and
- configuring the wireless device to operate in a separate acknowledgement mode when the load of the wireless network is less than or equal to the threshold;
- wherein when in the separate acknowledgement mode, the method further comprises:
  - receiving acknowledgement feedback for the unicast transmission according to the base sequence in a first acknowledgement time slot;
  - receiving acknowledgement feedback for the multicast transmission according to the base sequence in a second acknowledgement time slot different from the first acknowledgement time slot;
  - determining an ACK or a NAK for the unicast transmission from the acknowledgement feedback received in the first acknowledgement time slot; and
  - determining an ACK or a NAK for the multicast transmission from the acknowledgement feedback received in the second acknowledgement time slot.

18. The method of claim 17, further comprising transmitting a mode control signal to the wireless device, the mode control signal indicating either the joint acknowledgement mode or the separate acknowledgement mode.

* * * * *